United States Patent [19]
Shigematsu et al.

[11] Patent Number: 5,614,926
[45] Date of Patent: Mar. 25, 1997

[54] WORD PROCESSOR WITH A HANDWRITING TEXT PROCESSING FUNCTION

[75] Inventors: Hiroyuki Shigematsu, Funabashi; Hirofumi Nishikawa, Yao; Yukihiro Shibata, Soraku-gun, all of Japan

[73] Assignee: Sharp Kabushiki Kaisha, Osaka, Japan

[21] Appl. No.: 579,033

[22] Filed: Dec. 19, 1995

Related U.S. Application Data

[63] Continuation of Ser. No. 237,162, May 3, 1994, abandoned.

[30] Foreign Application Priority Data

May 17, 1993 [JP] Japan .................................. 5-114816
Jun. 28, 1993 [JP] Japan .................................. 5-157489

[51] Int. Cl.$^6$ ...................................................... G09G 5/00
[52] U.S. Cl. .............................................. 345/156; 178/18
[58] Field of Search ..................... 178/18, 19; 395/152, 395/155, 156; 348/169, 586; 345/157, 156, 179

[56] References Cited

U.S. PATENT DOCUMENTS

| | | |
|---|---|---|
| 4,839,634 | 6/1989 | More et al. .................................. 178/19 |
| 5,157,384 | 10/1992 | Greanias et al. . |
| 5,252,951 | 10/1993 | Tannenbaum et al. . |
| 5,270,820 | 12/1993 | Fellinger . |
| 5,347,295 | 9/1994 | Agulnick et al. . |

FOREIGN PATENT DOCUMENTS

| | | |
|---|---|---|
| 57-113135 | 7/1982 | Japan . |
| 63-206827 | 8/1988 | Japan . |
| 3-150265 | 6/1991 | Japan . |

OTHER PUBLICATIONS

Better Working Eight-in-one, Spinnaker, 1989, pp. 44, 45.
Smith Corona, Owner's Manual, 1991, pp. 4, 52, 47.
Kurtenbach et al, "Gestures in Human-Computer Communication", *The Art of Human-Computer Interface Design*, Apple Computer, Inc., pp. 309–317, 1990.

*Primary Examiner*—Ulysses Weldon
*Attorney, Agent, or Firm*—Nixon & Vanderhye P.C.

[57] ABSTRACT

A word processor is provided with a handwriting text processing function. A display displays document and text processing information. A pointing device enters handwritten text processing figures on a display. A memory stores text processing instructions associated with an text processing figure drawn on the screen. A direction in which the pointing device is moved on the screen to draw a figure, a length of the drawn figure on the screen, and/or which of several regions of the display the pointing device is presently pointing to are determined and used to distinguish different text processing functions associated with the same basic handwritten text processing figure. The word processor uses this information to selectively execute different kinds of text processing instructions such as an up-scroll of the screen, a down-scroll of the screen, a display of document head, a display of document tail, a display of underline, a display of line head, an arbitrary cursor movement, and a cursor shift on the same line.

14 Claims, 14 Drawing Sheets

LINE NUMBER

```
50  手書き編集（ジェスチャー）機能では、以下
51  の編集機能を行うことができます。・・・・
52  それぞれの機能について、操作方法を説明しま
 ·  す。・・・・・・・・・・・・・・・・・
 ·  ・・・・・・・・・・・・・・・・・・・
 ·
 ·
68  上画面ぐりは一画面分、上にスクロールします。
69  文頭機能は、文書の最初に戻って表示します。
```

UP-SCROLL

LINE NUMBER

```
30  この画面は一画面分上にスクロールしたところを      ← PREVIOUS
31  表示しています。・・・・・・・・・・・・        SCREEN
32
 ·
 ·
 ·
 ·
 ·
48  ・・・・・・・・・・・・・・・・・・・・
49  ・・・・・・・・・・・・・・・・・・・・
```

Fig.5(A)

LINE NUMBER

| 50 | 手書き編集（ジェスチャー）機能では、以下 |
| 51 | の編集機能を行うことができます。・・・・・ |
| 52 | それぞれの機能について、操作方法を説明しま |
| ・ | す。・・・・・・・・・・・・・ |
| ・ | ・・・・・・・・・・・・・・・・・・・・ |
| ・ | |
| ・ | |
| 68 | 上画面ぐりは一画面分、上にスクロールします。 |
| 69 | 文頭機能は、文書の最初に戻って表示します。 |

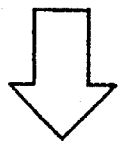
DOWN-SCROLL

LINE NUMBER

| 70 | 下画面ぐりは一画面分、下にスクロールします。 | ← |
| 71 | 文末機能は、文書の最終行を含む表示をします。 | NEXT |
| 72 | ・・・・・・・・・・・・・・・・・・・・ | SCREEN |
| ・ | この画面は一画面分下にスクロールしたところを | |
| ・ | 表示しています。・・・・・・・・・・・ | |
| ・ | ・・・・・・・・・・・・・・・・・・・・ | |
| 88 | ・・・・・・・・・・・・・・・・・・・・ | |
| 89 | ・・・・・・・・・・・・・・・・・・・・ | |

Fig.5(B)

LINE NUMBER

| 50 | 手書き編集（ジェスチャー）機能では、以下 |
| 51 | の編集機能を行うことができます。・・・・ |
| 52 | それぞれの機能について、操作方法を説明しま |
|    | す。・・・・・・・・・・・・・・・・ |
| ·  | ・・・・・・・・・・・・・・・・・・ |
| 63 |   |
| ·  |   |
| 68 | 上画面ぐりは一画面分、上にスクロールします。 |
| 69 | 文頭機能は、文書の最初に戻って表示します。 |

⬇ DOCUMENT TAIL

LINE NUMBER

| 76 | ・・・・・・・・・・・・・・・・・・ |
| 77 | ・・・・・・・・・・・・・・・・・・ |
| 78 | ・・・・・・・・・・・・・・・・・・ |
| ·  | ・・・・・・・・・・・・・・・・・・ |
| ·  | ・・・・・・・・・・・・・・・・・・ |
| ·  | 以上でジェスチャー機能の操作・画面操作の説明 |
| ·  | を終わります。・・（この行が文末です） |
| 94 | ・・・・・・・・・・・・・・・・・・ |
| 95 | ・・・・・・・・・・・・・・・・・・ |

← DOCUMENT TAIL

Fig.6

LINE NUMBER

| 50 | ~~手書き編集（ジェスチャー）~~ 機能では、以下 |
| 51 | の編集機能を行うことができます。・・・・・ |
| 52 | それぞれの機能について、操作方法を説明しま |
|    | す。・・・・・・・・・・・・・・・・・・・ |
|    | ・・・・・・・・・・・・・・・・・・・・ |
| 68 | 上画面ぐりは一画面分、上にスクロールします。 |
| 69 | 文頭機能は、文書の最初に戻って表示します。 |

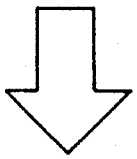

UNDERLINE

LINE NUMBER

| 50 | <u>手書き編集</u> （ジェスチャー）機能では、以下の |
| 51 | 編集機能を行うことができます。・・・・・ |
| 52 | それぞれの機能について、操作方法を説明しま |
|    | す。・・・・・・・・・・・・・・・・・・ |
|    | ・・・・・・・・・・・・・・・・・・・・ |
| 68 | 上画面ぐりは一画面分、上にスクロールします。 |
| 69 | 文頭機能は、文書の最初に戻って表示します。 |

Fig.7

LINE NUMBER CURSOR POSITION

50 手書き編集（ジェスチャー）機能では、以下の編集機能を行うことが
51 できます。
52 それぞれの機能について、操作方法を説明します。
・
・
68
69

《挿　入》A4縦 48字 6.0㍉ 横書 普 飾1 和文 10P 残22行 残約9900字
　　　　　　　　　　　　　　　　　　　　　　ロ-マ ひら 半角
　　　　　→ 1993年1月20日　14時17分

[切替]

GUIDANCE REGION

⬇ LINE HEAD

LINE NUMBER CURSOR POSITION

50 □手書き編集（ジェスチャー）機能では、以下の編集機能を行うことが
51 できます
52 それぞれの機能について、操作方法を説明します。
・
・
68
69

《挿　入》A4縦 48字 6.0㍉ 横書 普 飾1 和文 10P 残22行 残約9900字
　　　　　　　　　　　　　　　　　　　　　　ロ-マ ひら 半角
　　　　　→ 1993年1月20日　14時17分

GUIDANCE REGION

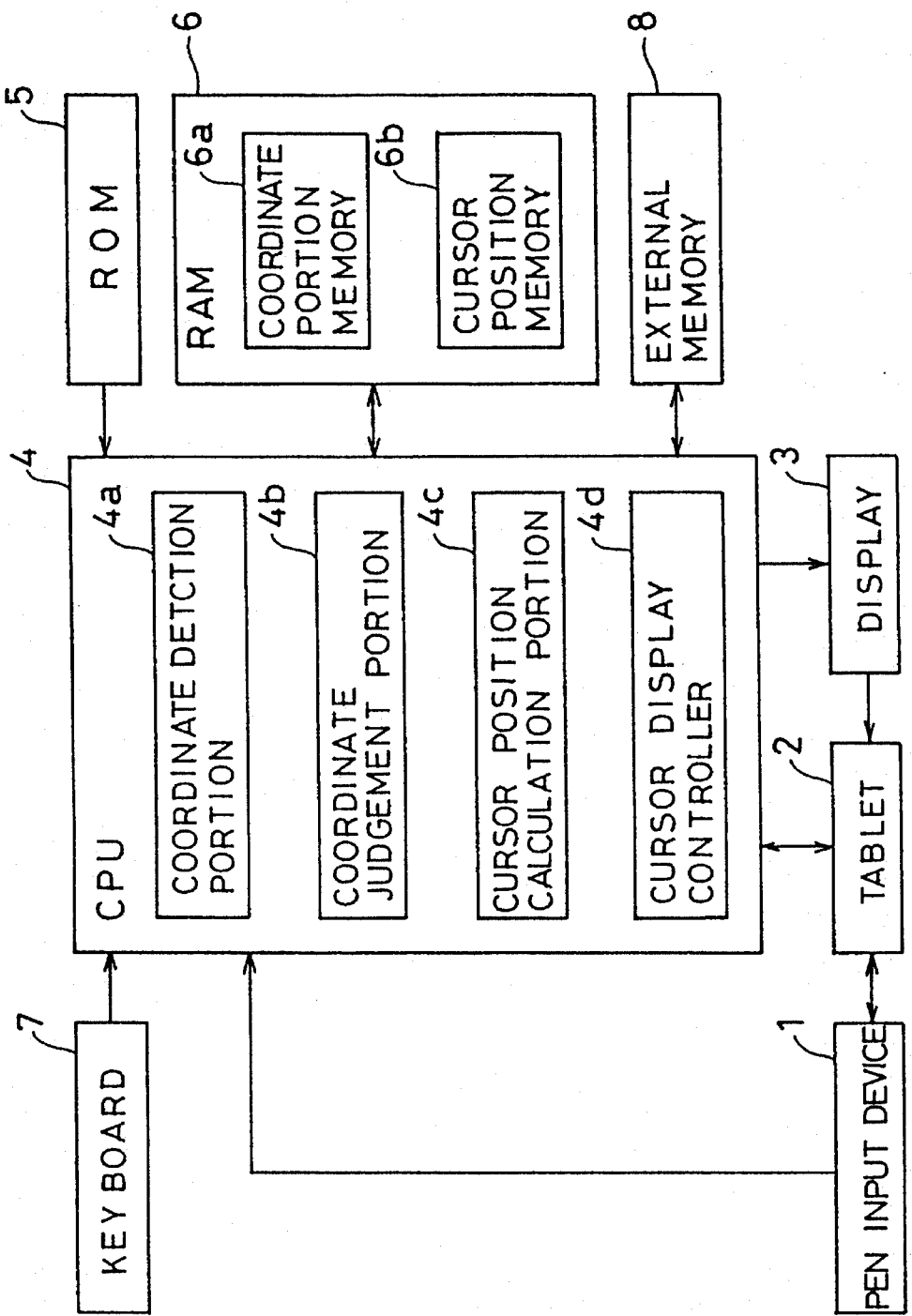

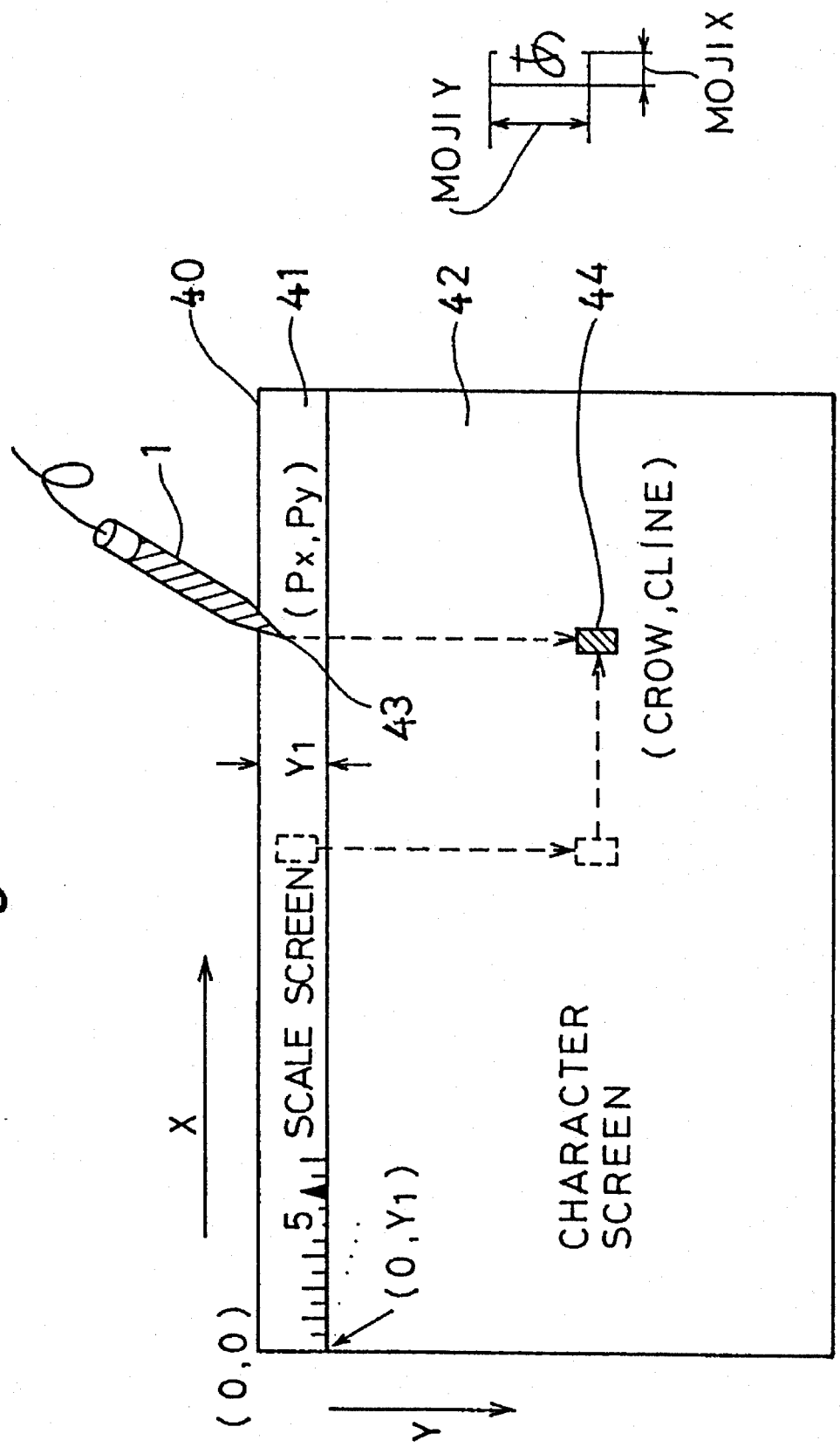

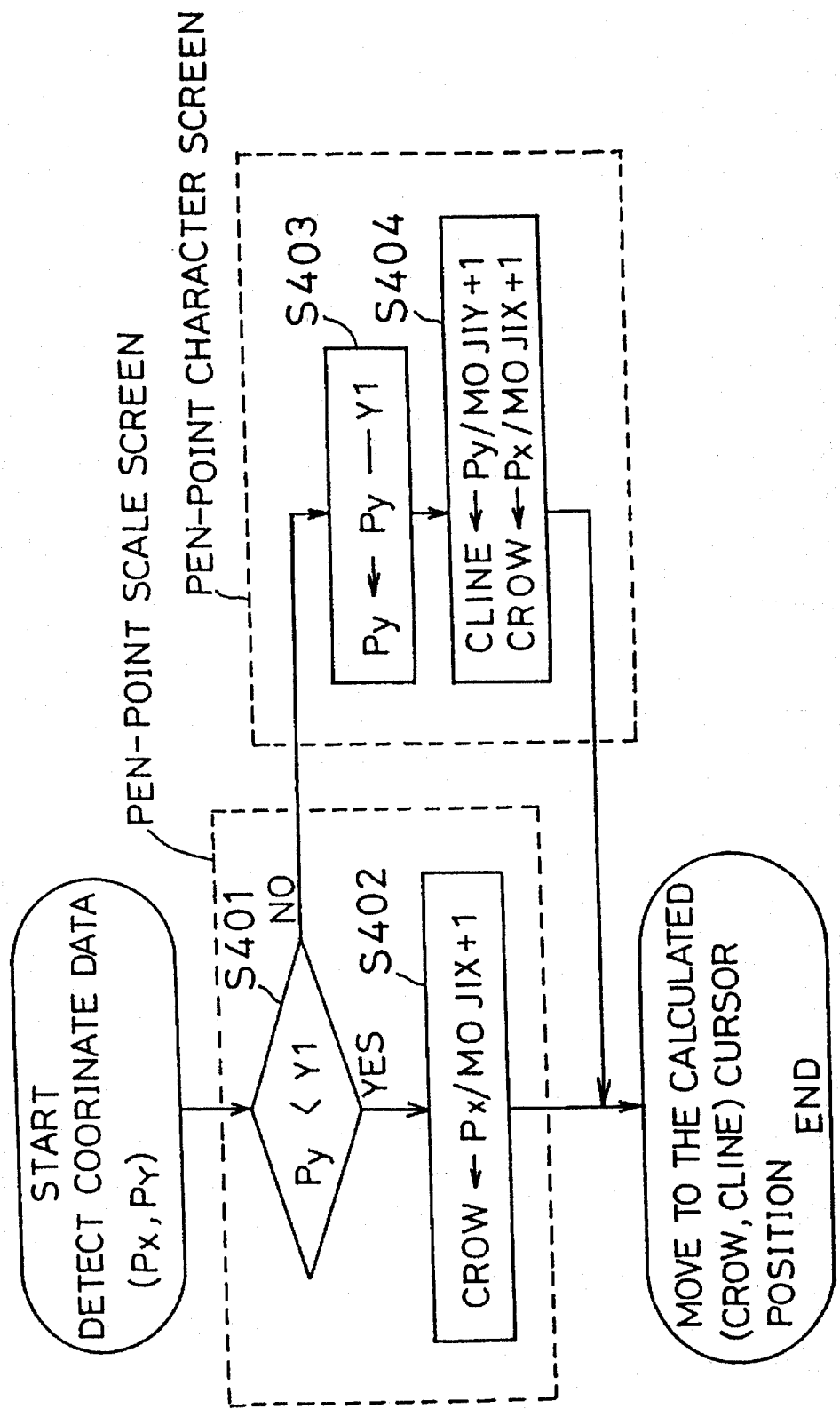

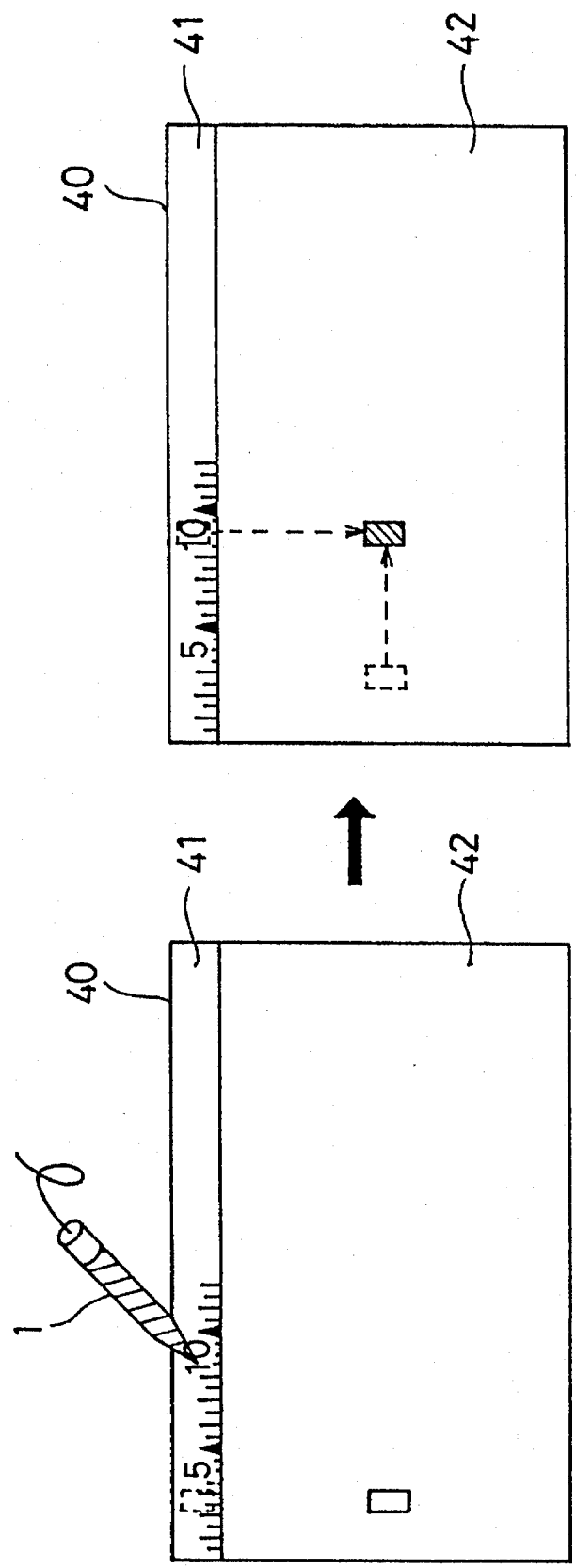

WORD PROCESSOR WITH A HANDWRITING TEXT PROCESSING FUNCTION

This is a File Wrapper Continuation of application Ser. No. 08/237,162, filed May 3, 1994. now abandoned.

BACKGROUND OF THE INVENTION

1. Field of the Invention

The present invention relates to a word processor provided with a handwriting text processing function, and more particularly to a word processor using a pointing device such as a pen, a mouse, a track ball or the like to enable handwritten input of various text processing instructions such as a deletion or an insertion of characters, screen scroll, and cursor movement.

2. Description of the Related Art

In the preparation and text processing of documents, most of conventional word processors and small business computers execute text processing instructions, such as deletion or insertion of characters, screen scroll, and cursor movement, through a predetermined key input from a keyboard. On the other hand, word processors provided with a pointing device such as a pen, a mouse, a track ball or the like use a pointing device to designate a position of a document displayed on a screen which enables execution of an text processing instruction through a pen-up and a pen-down operation for drawing a predetermined figure on the screen. In other words, such word processors execute text processing instructions by designating a position at which the instruction is to be executed and providing a handwritten figure corresponding to an text processing instruction to be executed at that point in the document. For example, drawing a vertical line segment (i.e., a handwritten figure) of appropriate length in the downward direction from an upper portion on a screen using a mouse executes an up-scroll function to display a document at a position prior to the current position by one screen.

Japanese Published Unexamined Patent Application No. SHO 63-206827 describes a display scroll mode using such a pointing device where a display image is moved at a natural speed appropriate for the operational sense of users by a designated movement amount designated with a printing device on a touch panel. In addition, Japanese Published Unexamined Patent Application No. HEI 3-150625 describes a method for entering instructions, such as deletion and insertion of characters, and spacing by drawing a predetermined pattern with a pointing device. Fewer kinds of patterns are used with a pattern having the same configuration but drawn in a different direction corresponding to two instructions.

Furthermore, Japanese Published Unexamined Patent Application No. SHO 57-113135 describes a method for entering cursor information using a tablet separate from a screen and an apparatus using the same method. A cursor is moved using coordinate data output from a tablet control circuit as coordinate data for a cursor and sending a difference between two consecutive cursor coordinate data as cursor movement information to a display.

As described above, when using word processors where various document text processing functions are initiated by drawing predetermined figures on a display screen with a pointing device, users are required to memorize all the various text processing figures. Handwritten text processing figures preferably remind users of corresponding text processing functions. However, when more text processing functions are provided, the number of text processing figures to remember increases also.

Japanese Published Unexamined Patent Application No. HEI 3-150625 provides a larger number of text processing functions without increasing the number and kind of text processing figures by allocating plural text processing functions to the same figure and distinguishing between those text processing functions by drawing the same figure in different directions.

Japanese Published Unexamined Patent Application No. SHO 57-113135 describes a method for entering cursor information. When a cursor position is moved by placing a pen on a desired character on a screen, the pen must be placed on a tablet while the user looks at the screen. However, the pen may not be placed at the desired tablet position so that the cursor is not moved to the desired screen position. Thus, a cursor information input method is required which has a simple structure and operation.

SUMMARY OF THE INVENTION

Therefore, the present invention provides a word processor provided with a handwriting text processing function which comprises a display for displaying a document and text processing information; a pointing device for entering handwritten text processing figures on a screen of the display; and a memory for storing an text processing instruction associated with text processing figures written on the screen.

A direction in which the pointing device is moved on the screen to draw a figure, a length of the drawn figure on the screen, and/or which of several regions of the display the pointing device is presently pointing to are determined and selectively used to distinguish different text processing functions associated with the same basic handwritten text processing figure. The word processor uses this information to selectively execute different kinds of text processing instructions such as up-scroll of the screen, down-scroll of the screen, display of the head of a document, display of the tail or end of a document, display of underline, display of the beginning or head of line, arbitrary cursor movement, and cursor shift on the same line.

BRIEF DESCRIPTION OF THE DRAWINGS

The present invention will be detailed in conjunction with accompanying drawings in which:

FIG. 5A is a view illustrating a down-scroll function according to the present invention;

FIG. 5B is a view illustrating a function of moving a cursor to a document tail according to the present invention;

FIG. 6 is a view illustrating an underline function according to the present invention;

FIG. 7 is a view illustrating a function of moving a cursor to line according to the present invention;

FIG. 8 is a block diagram showing a structure of the word processor in Embodiment 2 of the present invention;

FIG. 9 is a view illustrating a reaction between coordinate data and cursor position when a pen is placed on a certain position on a scale region;

FIG. 10 is a schematic flowchart showing a processing of a cursor position calculation in the present invention.

FIG. 11A and FIG. 11B illustrate an operating example when the pen is placed on the scale region.

DESCRIPTION OF THE PREFERRED EMBODIMENTS

Figure 1:
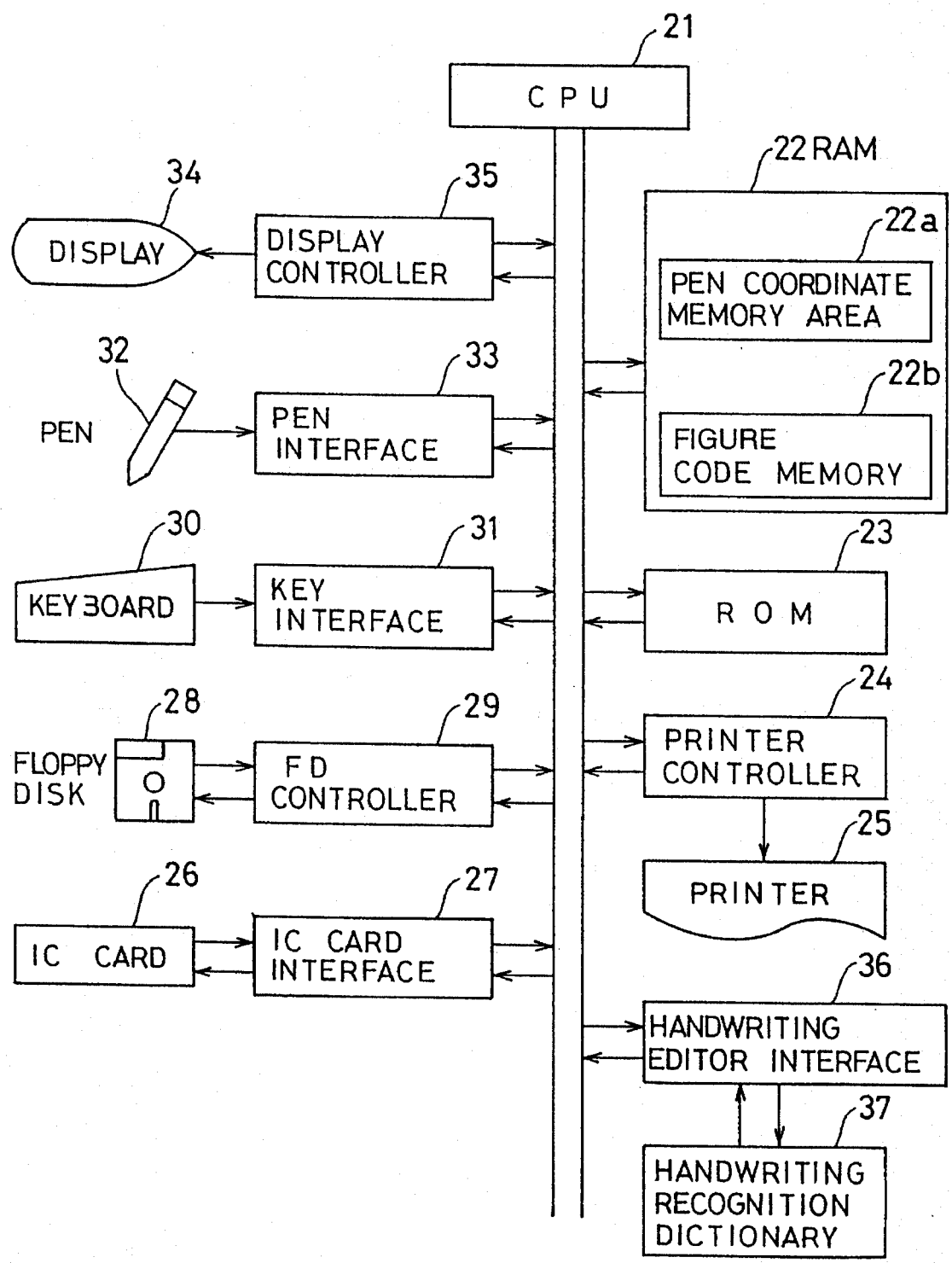
FIG. 1 is a block diagram showing a structure of a word processor in Embodiment 1 of the present invention.

A word processor provided with a handwriting text processing function in accordance with the present invention uses such input devices as a pen/tablet, a mouse, a track ball or the like as a pointing device. In particular, a pen/tablet integrated with a display screen is preferable. In addition, the tablet comprises a transparent digitizer of an electrostatic dielectric or of an electromagnetic dielectric type formed integrally on the display screen. Preferably, the tablet detects pen input information with a scanning signal and displays the input as a minimum display unit (dot unit) on a display screen. A liquid crystal display (LCD), a CRT display, an EL display or the like may be used.

A microcomputer which comprises a CPU, a ROM, a RAM and an I/O port includes a memory means, direction judgement means, length judgment means, region judgment means, and cursor position calculation means. The memory means uses ROM for storing fixed data such as text processing instructions and a configuration of text processing figures and a RAM for temporarily holding input data and instructions. An external memory device such as a floppy disk or a hard disk may also be used.

The CPU functions as a direction judgment means, length judgment means, and cursor position calculation means. The CPU is connected to external peripherals such as a pointing device and a display via a bus or interface circuit.

A word processor provided with handwritten text processing functions in accordance with the present invention will be described based on the above structure.

Text processing figure information includes a pen-down position and a pen-up position, the drawing direction of the figure, the length of the text processing figure, and the region of the display where the figure is drawn. The figure information may correspond to different text processing instructions stored in memory such as: the up-scroll of the screen, the display of a head of a document, the down-scroll of the screen, the display of a tail or end of a document, the arbitrary movement of a cursor, the display of underlines, and the shift of the cursor on the same line.

A pointing device is used to draw an text processing figure on a display screen having a predetermined configuration corresponding to a desired text processing instruction. Via the CPU, the direction judgment means judges the direction in which the figure is drawn on the screen. The length judgment means detects the length of the figure and judges whether the length is either longer or shorter than a predetermined length. The length judgment means and the direction judgment means judge the length and the direction, respectively, after recognizing which of a plurality of equally configured figures stored in memory resembles the drawn figure. The region judgment means judges where the designation points of the pointing device are located relative to regions in one of the display defined in advance. The text processing instruction is then identified based on the information judged by at least two or more of these CPU judging means. Point information comprising a pen-down position on a screen is also included in the text processing figure information.

When the length judgment means judges that the figure information is approximately equal and the region judgment means judges that the pen-down position is included in the document region, the cursor position calculation means corrects the scale region to calculate the cursor position corresponding to the lines and shift positions involved in the pen-down operation. When the region judgment means judges that the pen-down position is included in a display scale region, the cursor position judgement means calculates the shift of the cursor position on the same line.

In this manner, equally configured text processing figures drawn in different ways allow execution of two or more different text processing instructions. Consequently, a text processing figure drawn with the pointing device having the same configuration may correspond to a plurality of text processing instructions. Nonetheless, the text processing instructions are distinguished based on a difference in the direction and/or the length of the text processing figure and a difference in the region. Thus, a large number of text processing instructions may be executed without increasing the number and kinds of text processing figures.

The present invention will be detailed based on Embodiments 1 and 2 shown in the drawings. However, the present invention is not limited thereto. The present invention is suitable for a word processor such as a dedicated word processor, an electronic notebook, and a computer provided with a word processing function for office use, or for scientific calculation. The word processor will be explained as a word processor which permits text processing of a document with ten text processing figures drawn using a pointing device.

FIG. 1 is a block diagram showing a structure of a rod processor in Embodiment 1 of the present invention. Referring to FIG. 1, a central processing unit (CPU) 21 executes handwriting text processing of the present invention. A RAM 22 stores each kind of data. In particular, the RAM 22 includes a pen coordinate memory area 22a that stores data indicating a line segment drawn with a pen 32 described hereinafter and a figure code memory 22b for storing a numeric value corresponding to drawn text processing figures (hereinafter referred to as a "figure code"). A ROM 23 stores a control program the CPU 21 executes.

A printer controller 24 controls transmission of printing data to printer 25. An IC card 26 memorizes information for executing a specific function, and an IC card interface 27 controls the input and output of data into and out of the IC card 26. A floppy disk controller 29 drives floppy disk (FD) 28 for the input and output of data. A keyboard 30 and a key interface 31 are provided for outputting a key code from a received key input.

A pen 32 allows an operator to draw an text processing figure on a screen of a display 34 (described more later), and an pen interface 33 output pen input information for a pen operation such as a pen-down, a pen-up and a pen drag (trace of the figure drawing). A display 34 displays document and text processing information, and a display controller 35 controls displaying each kind of data on the display. As the display 34, either a CRT or an LCD is used. On the display screen of the display 34, a tablet (not shown in the drawings) is connected to a pen interface 33.

A handwriting text processing interface 36 reads a handwriting recognition text processing dictionary 37 based on pen input information output from the pen interface 33 to output a figure code corresponding to the result of the recognition of the drawn figure. The handwriting recognition dictionary 37 stores a pen trace and a figure code corresponding to the pen trace.

Figure 2A:
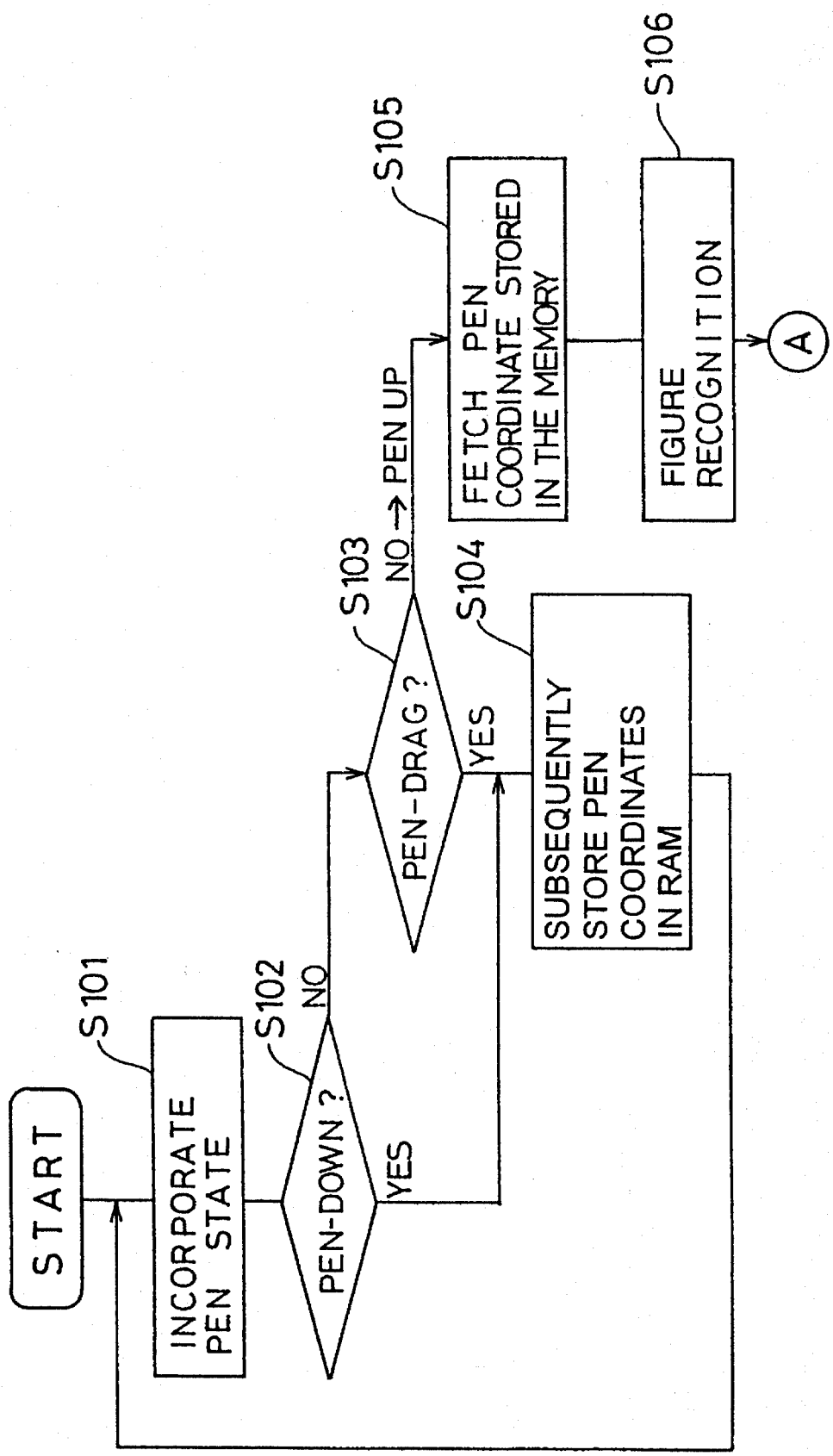
FIGS. 2A and 2B are a flowchart of a handwriting text processing function in Embodiment 1 of the present invention.
Figure 2B:
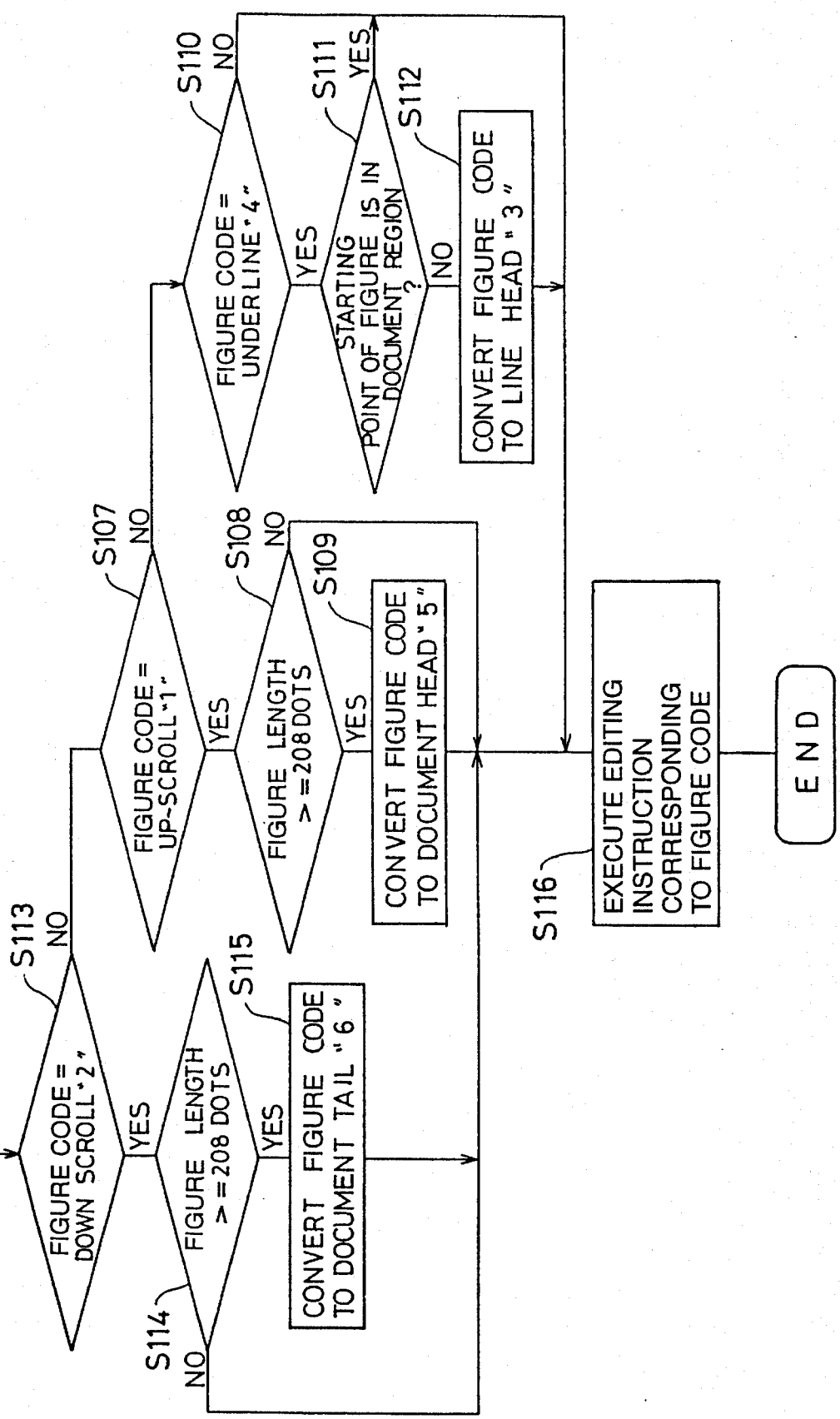

The handwritten text processing function of the present invention will be detailed. FIGS. 2A and 2B show a flowchart of a handwriting text processing function. Referring to the flowchart shown in FIG. 2A, step S101 is a step at which the pen interface judges the state of a pen with respect to the screen and incorporates the pen input information with respect to the pen state. The pen can be placed in the following four states.

(1) Pen-down—the pen is just placed on the screen.

(2) Pen-drag—the pen is moving on the screen.

(3) Pen-up—the pen is raised from the screen.

(4) Pen not used.

Corresponding to the above three states (1–3), the pen screen coordinates where the pen state is generated and the pen state itself are sent from the pen interface 33 to the CPU 21. For example, in a display screen shown in FIG. 3, the pen coordinates are represented by a screen dot coordinate of X-axis and Y-axis. In general, X-axis in the horizontal direction is represented by 640 dots whereas Y-axis in the vertical direction by 400 dots.

At step S102, the CPU 21 checks whether or not the state incorporated from the pen interface 33 is generated. In the presence of the pen-down state, the process proceeds to step S104. In the absence thereof, the process proceeds to step S103. At step S103, the CPU 21 checks whether or not the state incorporated from the pen interface 33 is generated. In the presence of the pen drag state, the process proceeds to step S104. In the absence of the pen drag state, the process proceeds to step S105. At step S104, the CPU 21 subsequently stores the pen coordinates incorporated at step S101 in the pen coordinate memory area of the RAM 22.

Thereafter, the process returns to step S101, and the pen coordinate is incorporated for several msec so that the processing is repeated for subsequently storing the pen coordinates in the pen coordinate memory area. At step S105, the pen-up state has just been initiated. Here, a pair of pen coordinates stored in the pen coordinate memory at step S104 are fetched and sent to the handwriting recognition interface 36. Then, the process proceeds to step S106. The handwriting recognition interface 36 uses the handwriting recognition dictionary 37 to perform figure recognition relative to the pair of pen coordinates fetched at step S105 so that a figure code corresponding to the recognized figure and the position coordinates of the start point and the end point of the figure are output. The CPU 21 stores the figure code and the position coordinates in the figure code memory 22b.

The figure recognition recognizes a drawn trace connecting the pair of pen coordinates with a straight line in chronological order as an text processing figure. Figure recognition determines which of the previously stored text processing figures resemble the direction and configuration of the current handwritten trace to select an approximate text processing figure. Figure recognition itself is known in the art. The figure code represents a corresponding text processing instruction with a numerical value.

Incidentally, the drawn figure, the text processing instructions, and the figure code are stored so that they correspond to each other. For example, the trace of a horizonal straight line drawn from left to right is recognized as an text processing instruction "underline", and a value of "4" is allotted as the corresponding figure code. Here, "underline" means a function of drawing a line under a desired string of character changes in the document.

In addition, an text processing instruction of an "up-scroll" corresponds to the trace of a vertical straight line in the downward direction from the upper portion of the screen while a value of "1" is allotted to the corresponding figure code.

An text processing instruction of a "down-scroll" corresponds to the trace of a vertical straight line in the upward direction from the lower portion while a value of "2" is allotted to the corresponding figure.

The "up-scroll" is a function of displaying a document portion immediately before the document portion currently displayed on a preset number of lines thereof. The "down-scroll" is a function of displaying a document portion immediately following document portion currently displayed on the screen or a preset number of lines thereof. The "down-scroll" is a function of displaying a document portion immediately following document currently displayed on the screen or a preset number of lines thereof.

In addition, text processing functions such as "display of line head", "display of document head", and "display of document tail" are available. Such numbers as "3", "5" and "6" are allotted as corresponding figure codes, respectively. The "display of line head" sets the display position of a cursor to the position of the first character of a line designated by the cursor. The "display of document head" displays the first line of a document currently edited. The "display of document tail" displays the last line of a document currently edited.

Referring to the flowchart shown in FIG. 2B, at step S113, CPU 21 checks whether or not the value stored in the figure code memory 22b is "2" or not. In other words, step S113 checks whether "down-scroll" is performed. In the presence of "down-scroll", the process proceeds to step S114. In the absence of "down-scroll", the process proceeds to step S107.

Step S114 calculates a distance between the start point and the end point from the position coordinates stored along with the figure code to check whether the distance corresponds to 208 dots or more. When the distance is 208 dots or more, the process proceeds to step S115. When the distance is less than 208 dots, the process proceeds to step 116. For a word processor where the height of one character plus one pitch thereof is represented by 16 dots, 208 dots correspond to a length of 13 display lines in the vertical direction. Of course, 208 dots is only one example, and it can be converted to another preferably value depending on an apparatus actually used.

When the distance is 208 dots or more at step 115, a value in the figure code memory is converted to "6". In other words, when a vertical line is drawn in the upward direction from the lower portion of the screen to a length of 13 lines or more, the value in the figure code memory is converted to "6" thereby judging that a function of "display of document tail" is entered.

At step 107, the CPU 21 checks the value stored in figure code memory 22b as to whether the value stored in the figure code memory 22b is "1" or not. In other words, the step is to check whether the process is the "up-scroll" or not. In the case of the "up-scroll", the process proceeds to step S110.

In the presence of the "up-scroll", step 108 is performed to calculate a distance between the start point and the end point from the position coordinates of the start point and the end point stored along with figure memory 22b. In other words, step 108 is to check whether the distance corresponds to 208 dots or more. When the distance is 208 dots or more, the process proceeds to step S109. When the distance is less than 208 dots, the process proceeds to step 116.

When the distance is 208 dots or more at step S109, the value in the figure code memory 22b is converted to "5" thereby determining that the function if displaying document head is entered.

The CPU 21 checks whether the value stored in the figure code memory is "4" or not at step S110. In other words, step S110 is to check whether the process is the "underline display" or not. When the process is the "underline display", the process proceeds to step S111. When the process is not the "underline display", the process proceeds to step S116.

Figure 3:
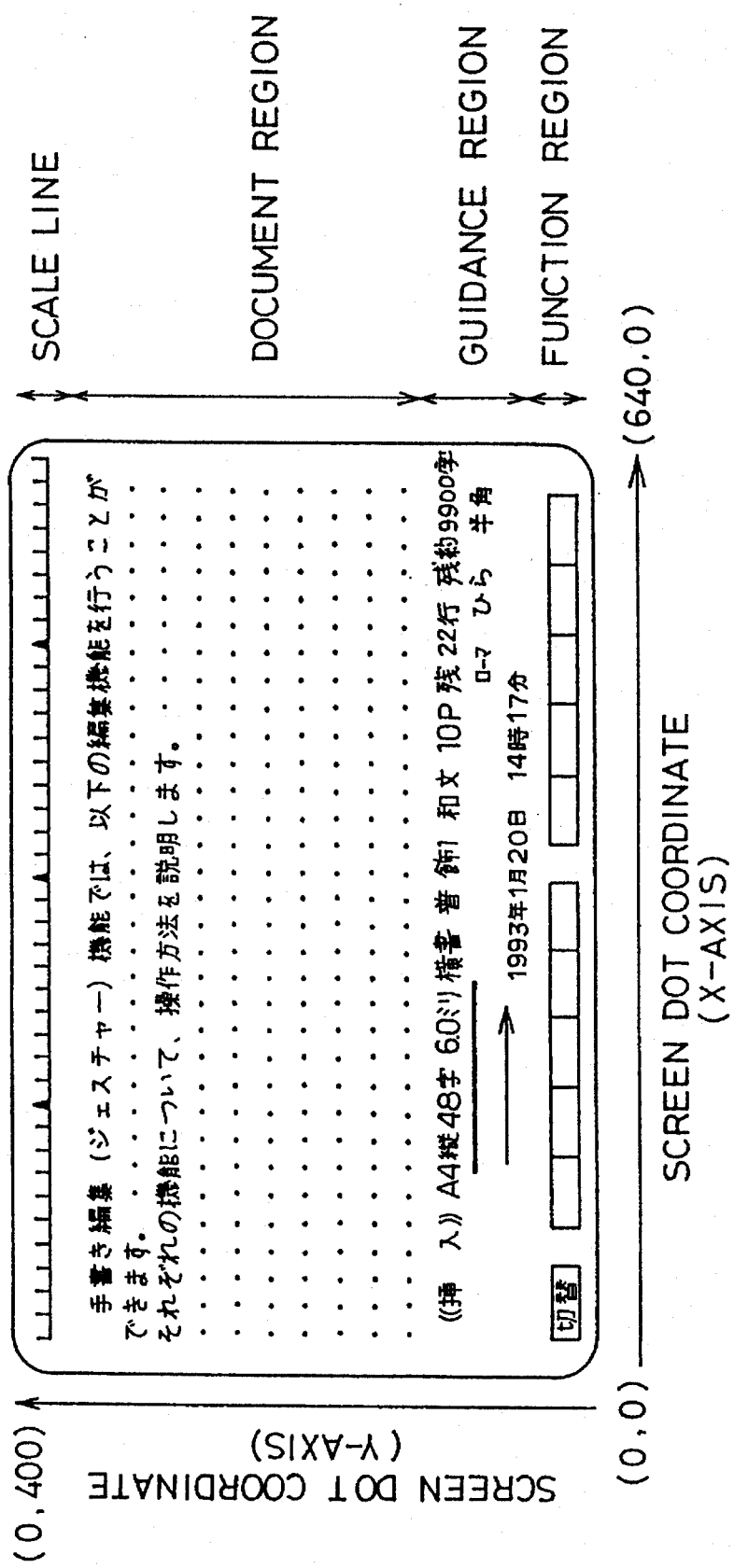
FIG. 3 is a view illustrating an example of a display screen according to the present invention.

When the process is the "underline display" at step S111, the CPU 21 checks whether the position coordinate of the start point along with the figure code is located within the document region or not. When the position coordinate is located in the document region, the process proceeds to step S116. When the position is not located in the document region, the process proceeds to step S112. The document region here means a region where a document actually entered on the display screen is displayed as shown in FIG. 3. Underlining a string of characters desired to be underlined to a length corresponding to the length of the string is easy to understand and preferable.

Then, when the coordinates of the position at which the pen is placed on the screen (the start point) are located within the range of the coordinates defining the document region set in advance, the CPU 21 judges that the start point is located within the document region. Other display regions include scale lines on the upper portion of the display screen (scale region), a guidance region, and a function region on the lower portion of the screen as shown in FIG. 3.

At step S112, when the start point of the pen is not located in the document region, the value in the figure code memory 22b is converted to "3". When a straight line is drawn in the horizontal direction, the figure code is set to "3" thereby judging that the function of line head is entered. At step S116, the CPU 21 executes the predetermined text processing function of each text processing figure relative to values stored in the figure code memory 22b.

Figure 4A:
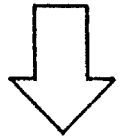
FIG. 4A is a view illustrating an up-scroll function according to the present invention.
Figure 4B:
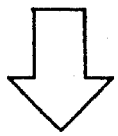
FIG. 4B is a view illustrating a function of moving a cursor to a document head according to the present invention.

FIG. 4A shows an operation example of the up-scroll function. FIG. 4B shows an operation example of the document head function. A thick line designates the trace of the pen whereas an arrow line a movement direction of the pen. As shown in FIG. 4A, when the length of vertical line in the downward direction from the upper portion is less than 13 lines, the up-scroll function is executed to scroll back to an earlier screen displayed one screen before the execution of the function. In FIG. 4B, when the vertical length is 13 lines or more, a screen is displayed which contains the document head that is to be edited.

FIG. 5A shows an example of the down-scroll function whereas FIG. 5B shows an example of the document end function. A thick line designates the trace of the pen whereas an arrow line designates the movement direction of the pen. As shown in FIG. 5A, when the length of the vertical line in the upward direction from the lower is less than 13 lines, the down-scroll is executed to scroll onto a screen following the screen that has been displayed before the execution of the function. In FIG. 5B, a screen is displayed which shows the document tail that is to be edited.

FIG. 6 shows an operation example of the underline function. Drawing with a pen a line above a string of characters to be underlined in the document region on the display screen in the horizonal direction allows the string of characters to be underlined.

FIG. 7 shows an operation example of the line head function. When a line is drawn in the left to right direction within the guidance region, the cursor is moved to the head of line currently displayed to display a line including the head thereof.

As described above, recognizing a difference between the length of a line drawn as a figure and a region where a figure is drawn allows allotment of a plurality of text processing functions to the same figure. In accordance with the present invention, a difference between the length of a figure drawn on a display screen and a position where the figure is drawn are used to allot a plurality of text processing instructions to figures having the same configuration, thereby allowing the input of many text processing functions while only drawing a figure having a simple configuration without increasing the number and kinds of figures.

FIG. 8 is a block diagram showing the structure of the word processor in Embodiment 2 according to the present invention. A pen input device (pen) 1 enables entering a handwritten character and a figure on a table device 2. A pen point signal by the pen-down (hereinafter referred to as pen point) of a cursor position is output. A table input device 2 includes a transparent digitizer of an electrostatic dielectric or an electromagnetic dielectric type integrally constituted on the display screen. The tablet device 2 scans the while region of a display screen with a scanning signal for detecting at which point on the screen is pen pointed from the pen input device 1. A display 3 comprises, for example, an LCD screen including a scale region and a document region to display characters and cursors entered into a character preparation screen.

A CPU 4 controls the word processor. A coordinate detecting portion 4a incorporating a pen point signal from a pen input device 1 detects the coordinate data (pen coordinate). A coordinate judgment portion 4b judges whether the coordinate data correspond to the pen pointed location is located either in the scale region (scale screen) or in the document region (character screen). A cursor position calculating portion 4a calculates the cursor position based on the results of the coordinate judgment portion 4b. A cursor display controller 4d displays a cursor position calculated at the cursor position calculating portion 4c on a display 3, the controller being controlled based on each control program stored in the ROM 5 by CPU 4.

ROM 5 stores each program such as a cursor position calculation processing program, a tablet control program, input data processing program, document processing program and each kind of control program such as the display control program, and a data table for detecting and judging input data. RAM 6 stores document data, display data and data just being controlled. Coordinate position memory 6a stores coordinate data. Cursor position memory 6b stores cursor position data.

A keyboard 7 is used for entering character and symbol information and function selection. An external memory 8 is constituted on a floppy disk (FD) device and a hard disk (HD) device to store document data, control data nd the like.

FIG. 9 is a view illustrating a relation between coordinate data and cursor position data when pen pointed on a scale region. Reference Numeral 40 designates a character preparation screen on a display 3 in which a tablet device 2 is installed, a scale region 41 which displays the digit number, and a character screen region 42 which displays characters. Coordinate data (Px, Py) 43 of the pen pointed on tablet device 2 are stored in the coordinate position memory 6a in the RAM 6. A cursor position 44 calculated at a cursor position calculating portion 4c designates the cursor position (CROW, CLINE) in the character screen and is stored in the cursor position memory 6b in the RAM 6. Symbols X, Y, CROW, CLINE, MOJIX and MOJIY are explained below. Symbol Y designates the Y-coordinate of the overall region of a screen (character preparation screen), representing the dot value in the vertical direction whereas symbol Y1 designates the dot value in the vertical direction of the scale region. Symbol X designates the X-coordinate of the overall region of a screen (character preparation screen), representing the dot value in the horizontal direction. Symbol CROW designates shift position data out of cursor position data, which is represented by an integer. Symbol CLINE designates line position data out of cursor position data, which is represented by an integer. Symbol MOJIX designates a half-size width of character display on the screen, which is represented by the dot number. Symbol MOJIY designates a height of display of characters on the screen, which is represented by the dot number.

FIG. 10 is schematic flowchart designating the processing of a cursor position calculation in accordance with the present invention. FIG. 10 s also a view illustrating a schematic flow in which cursor position data is determined from the coordinate data (Px, Py) detected by the coordinate detection portion 4a.

Step S401 judges whether or not a Y-coordinate value Py of the pen pointed coordinate data is smaller than Y1. When the Y-coordinate value Py is smaller than Y1 within the scale region, the process proceeds to step S402. When the Y-coordinate value exceeds Y1 within the scale region on the screen, the process proceeds to step S403.

When the Y-coordinate value Py is located within the scale region at step S402, a cursor position calculation portion 4c divides the X-coordinate value Px by the dot number of MOJIX half-size width of character display into an integer followed by adding 1 thereto (since the digit position is one place higher). The value thus obtained is set to the cursor position memory 6b as digit position data CROW (at this time, line position data CLINE is not converted). Subsequently, the cursor position controller 4d displays cursor position data (CROW, CLINE) on the character preparation screen of the display 3 and completes the process. Thus, pen pointing a desired cursor position in a scale region enables the cursor position currently displayed on the character preparation screen to be moved to the digit position on the same line.

FIGS. 11A and 11B illustrate the cursor shift when a cursor position is pen pointed. For example, FIG. 11A shows a state in which display position in the neighborhood of the digit position 10 on the scale region when the cursor position is defined as CROW=4 and CLINE=8. FIG. 11B designates the cursor position after the cursor shift, CROW=10 and CLINE=8 after passing through the processes at steps 401 and 402.

When the Y-coordinate value Py exceeds Y1 and is located in the region of character screen at step 403, the cursor position calculation portion 4c subtracts the dot number of Y1 from the pen pointed Y-coordinate value Py to convert the Y-coordinate value Py on the character screen.

At step 404, the cursor position calculation means 4C divides the converted Y-coordinate value Py by the display height MOJIX followed by translating the number thus divided into an integer to which 1 is added. The number thus obtained is set to the cursor position memory 6b as digit position data CROW. Then, the cursor display controller 4d displays cursor position data (CROW, CLINE) set in the cursor position memory 6b on the character preparation screen of display 3 thereby completing the process.

Consequently, pen pointing the character screen enables moving the cursor position to the line and the digit position pointed with the pen. Pen pointing the cursor position on the scale region enables moving the cursor position to the digit position on the same line as the current cursor position on the character preparation screen. On the other hand, pen pointing the cursor position on the character screen allows moving the cursor position to the line and digit position pointed with the pen. In particular, when the number of digits in each frame is known in advance in preparing a table, the burden generated in preparing a table is alleviated by moving the cursor position with pen pointing to the scale region.

What is claimed is:

1. A word processor providing handwritten document processing functions, comprising:

a display including a plurality of display regions for displaying a document including text characters in a document display region and document processing information in another display region;

a pointing device for drawing any one of a plurality of document processing function-symbolic figures while displaying its related document on the display;

a memory for storing for each document processing function-symbolic figure a document processing figure and a set of instructions for implementing a document processing operation associated with that document processing figure, at least some of the document processing figures being associated with two different document processing operations and the document processing operations include an up-scroll of the screen, a down-scroll of the screen, a display of a beginning of a document head, and a display of an end of the document; and a processor for performing the following steps:
   analyzing a document processing function-symbolic figure drawn on the display with the pointing device with one of the stored document processing figures and identifying a corresponding one of the stored document processing figures;
   selecting one of the two document processing operations associated with the identified document processing figure based on a determination of a direction in which the pointing device is moved on the display when the document processing figure is drawn and a determination of a length of the drawn document processing figure; and
   executing the set of document processing instructions associated with the selected document processing operation.

2. A word processor according to claim 1, wherein the processor detects a sequence of a pen-down position followed by a pen-up position of the pointing device with respect to the display to determine the direction in which the pointing device is being moved while drawing the document processing figure, and when the processor determines that the pointing device is being moved in a downward direction from an upper portion of the display, the processor executes the set of document processing instructions for implementing the up-scroll operation when the length of the drawn figure is less than a predetermined length and the set of document processing instructions for implementing the document head display operation when the length of the drawn figure is greater than the predetermined length.

3. A word processor according to claim 1, wherein the processor detects a sequence of a pen-down position followed by a pen-up position of the pointing device with respect to the display to determine an upward direction in which the pointing device is moved from a lower portion of the display while drawing a figure, the processor executing the set of document processing instructions for implementing the down-scroll operation when the length of the drawn figure is less than a predetermined length and the set of document processing instructions for implementing the document tail display operation when the length of the drawn figure is greater than the predetermined length.

4. A word processor providing handwritten document processing functions, comprising:

a display including a plurality of display regions for displaying a document including text characters in a document display region and document processing information in another display region;

a pointing device for drawing any one of a plurality of document processing figures displayed on the display;

a memory for storing for each document processing figure a set of document processing instructions for implementing a document processing operation associated with that document processing figure, at least some of the document processing figures being associated with two different document processing operations; and a processor for performing the following steps:

analyzing a document processing figure drawn on the display with the pointing device with one of the stored document processing figures and identifying a corresponding one of the stored document processing figures;

selecting one of the two document processing operations associated with the identified document processing figure based on a direction in which the pointing device is moved on the display when the document processing figure is drawn and a particular one of the display regions in which the document processing figure is drawn; and executing the set of document processing instructions associated with the selected document processing operation.

5. The word processor according to claim 4, wherein the document processing operations include a display of an underline, a display of a line head, and cursor movement.

6. A word processor according to claim 5, wherein the processor detects a sequence of a pen-down position followed by a pen-up position of the pointing device to determine if the pointing device was moved from a left portion of the display to an upper right portion of the display while drawing a figure and executes the set of document processing instructions for implementing the underline display operation when the drawn figure is included within a document display region and the set of document processing instructions for implementing the line head display operation when the drawn figure is within a guidance display region not included in the document display region.

7. A word processor according to claim 5, wherein the processor detects a sequence of a pen-down position followed by a pen-up position to determine if a figure drawn on the display is approximately a point, and if so, executes the set of document processing instructions for implementing the cursor movement operation to move a position of a displayed cursor to a digit position on a same display line where the cursor is currently located when the pen-down position is located in a scale display region which is not included in the document display region.

8. A word processor according to claim 5, wherein the processor detects a pen-down position of the pointing device on the display in a scale display region different from the document display region, and from that detected pen-down position, calculates a corresponding cursor position in the document display region and causes a cursor to be displayed at that corresponding cursor position.

9. A method for processing a document using handwritten document processing figures comprising the steps of:

displaying a document including text characters in a document display region of a display;

using a pointing device, drawing any one of a plurality of document processing function-symbolic figures and displaying the drawn figure on the display;

storing for each document processing function-symbolic figure a document processing figure and a set of document processing instructions for implementing a document processing operation associated with that document processing figure, at least some of the document processing figures being associated with two different document processing operations and the document processing operations include an up-scroll of the screen, a down-scroll of the screen, a display of a beginning of a document head, and a display of an end of the document;

analyzing a document processing function-symbolic figure drawn on the display with the pointing device with one of the stored document processing figures and identifying a corresponding one of the stored document processing figures;

selecting one of the two document processing operations associated with the identified document processing figure based on a direction in which the pointing device is moved on the display when the document processing figure is drawn and a length of the drawn document processing figure; and executing the set of document processing instructions associated with the selected document processing operation.

10. A method according to claim 9, further comprising:

detecting a sequence of a pen-down position followed by a pen-up position of the pointing device with respect to the display to determine the direction in which the pointing device is being moved while drawing the document processing figure; and when the pointing device is moved in a downward direction from an upper portion of the display, executing the set of document processing instructions for implementing the up-scroll operation when the length of the drawn figure is less than a predetermined length, and executing the set of document processing instructions for implementing the document head display operation when the length of the drawn figure is greater than the predetermined length.

11. A method for processing a document using handwritten document processing figures comprising the steps of:

displaying a document including text characters on a display having plural display regions in a document display region;

drawing any one of a plurality of document processing figures using a pointing device and displaying the drawn document processing figure on the display;

storing for each document processing figure a set of document processing instructions for implementing a document processing operation associated with that document processing figure, at least some of the document processing figures being associated with two different document processing operations;

analyzing a document processing figure drawn on the display with the pointing device with one of the stored document processing figures and identifying a corresponding one of the stored document processing figures;

selecting one of the two document processing operations associated with the identified document processing figure based on a direction in which the pointing device is moved on the display when the document processing figure is drawn and a particular one of the display regions in which the document processing figure is drawn; and executing the set of document processing instructions associated with the selected document processing operation.

12. A method according to claim 11, wherein the processor detects a sequence of a pen-down position followed by a pen-up position of the pointing device to determine if the pointing device was moved from a left portion of the display to an upper right portion of the display while drawing a figure and executes the set of document processing instructions for implementing an underline display operation when the drawn figure is included within a document display region and the set of document processing instructions for implementing a line head display operation when the drawn figure is within a guidance display region not included in the document display region.

13. A method according to claim 11, wherein the processor detects a sequence of a pen-down position followed by a pen-up position to determine if a figure drawn on the display is approximately a point, and if so, executes the set of document processing instructions for implementing a cursor movement operation to move a position of a displayed cursor to a digit position on a same display line where the cursor is currently located when the pen-down position is located in a scale display region which is not included in the document display region.

14. A method according to claim 11, wherein the processor detects a pen-down position of the pointing device on the display in a scale display region different from the document display region, and from that detected pen-down position, calculates a corresponding cursor position in the document display region and causes a cursor to be displayed at that corresponding cursor position.

* * * * *